United States Patent
Xie et al.

(10) Patent No.: US 10,104,400 B2
(45) Date of Patent: Oct. 16, 2018

(54) VIDEO ENCODING AND DECODING METHOD, DEVICE, AND SYSTEM

(71) Applicant: ZTE CORPORATION, Shenzhen (CN)

(72) Inventors: Daxiong Xie, Shenzhen (CN); Ning Wang, Shenzhen (CN); Wen Zuo, Shenzhen (CN); Xiaomu Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 655 days.

(21) Appl. No.: 14/423,624

(22) PCT Filed: Jul. 29, 2013

(86) PCT No.: PCT/CN2013/080334
§ 371 (c)(1),
(2) Date: Apr. 2, 2015

(87) PCT Pub. No.: WO2013/185707
PCT Pub. Date: Dec. 19, 2013

(65) Prior Publication Data
US 2015/0215651 A1    Jul. 30, 2015

(30) Foreign Application Priority Data
Aug. 29, 2012  (CN) .......................... 2012 1 0312893

(51) Int. Cl.
*H04N 19/50* (2014.01)
*H04N 19/85* (2014.01)
(Continued)

(52) U.S. Cl.
CPC ............. *H04N 19/85* (2014.11); *H04N 19/12* (2014.11); *H04N 19/172* (2014.11);
(Continued)

(58) Field of Classification Search
CPC ........................... H04N 19/172; H04N 19/186
(Continued)

(56) References Cited

U.S. PATENT DOCUMENTS

2008/0123737 A1* 5/2008 Sekiguchi .............. H04N 19/70
375/240.01
2011/0243225 A1  10/2011 Min et al.

FOREIGN PATENT DOCUMENTS

CN     1728833      2/2006
CN     101588495    11/2009
(Continued)

*Primary Examiner* — William C Vaughn, Jr.
*Assistant Examiner* — Jerry Jean Baptiste
(74) *Attorney, Agent, or Firm* — Pearl Cohen Zedek Latzer Baratz LLP (57) ABSTRACT

A video encoding and decoding method, device and system is disclosed, wherein the method includes: after using a standard encoding algorithm to complete encoding a luminance component in a current image, judging, based on refreshing images preset by an encoding device, whether there is a need to encode a chrominance component in the current image in accordance with the standard encoding algorithm or not, and encoding the corresponding chrominance component in accordance with the standard encoding algorithm if the current image is any one of the refreshing images preset by the encoding device, otherwise, not encoding the corresponding chrominance component in accordance with the standard encoding algorithm, wherein an encoding reconstruction of the chrominance component is obtained by copying a corresponding chrominance component in a reference image of luminance component, so that a finally output code stream does not comprise information of the corresponding chrominance component.

10 Claims, 2 Drawing Sheets

(51) Int. Cl.
    *H04N 19/12*          (2014.01)
    *H04N 19/186*        (2014.01)
    *H04N 19/44*          (2014.01)
    *H04N 19/66*          (2014.01)
    *H04N 19/172*        (2014.01)

(52) U.S. Cl.
    CPC ........... *H04N 19/186* (2014.11); *H04N 19/44* (2014.11); *H04N 19/50* (2014.11); *H04N 19/66* (2014.11)

(58) Field of Classification Search
    USPC ........................................................ 375/240
    See application file for complete search history.

(56) References Cited

FOREIGN PATENT DOCUMENTS

| | | |
|---|---|---|
| CN | 102648628 | 8/2012 |
| WO | WO 2008/127072 | 10/2008 |
| WO | WO 2012090504 | 7/2012 |

\* cited by examiner

VIDEO ENCODING AND DECODING METHOD, DEVICE, AND SYSTEM

CROSS-REFERENCE TO RELATED APPLICATIONS

This application is a National Phase Application of PCT International Application No. PCT/CN2013/080334, entitled "VIDEO ENCODING AND DECODING METHOD, DEVICE, AND SYSTEM", International Filing Date Jul. 29, 2013, published on Dec. 19, 2013 as International Publication No. WO 2013/185707, which in turn claims priority from Chinese Patent Application No. 201210312893.4, filed Aug. 29, 2012, all of which are incorporated herein by reference in their entirety.

TECHNICAL FIELD

The present document relates to the field of video processing technology, and more particularly, to a video encoding and decoding method, device and system.

BACKGROUND OF THE RELATED ART

Currently, with the continuous development of communication technology, video communication also begins gaining popularity in people's daily life and work, and accordingly, the user requirements for the user experience are also rising, and therefore video encoding and decoding technologies which can support high resolution and high definition codec have become an inevitable trend of development.

The encoding quality of related video compression technologies is not satisfactory in some conditions where the channel bandwidth is limited, for example, in the 3G (3rd-generation, the third generation mobile communication technology) channel, the bandwidth allocated to video communication is only 50 kbps or so, in order to guarantee the video quality, the relevant video compression standards can only achieve video compression at the QCIF (Quarter common intermediate format) level, wherein the QCIF is a commonly used standardized image format, and the H.323 protocol suite specifies the standard acquisition resolution of the video acquisition equipment, however, for a terminal which can support a large resolution, this video quality is unacceptable.

To do this, how to improve the video compression efficiency and video quality in video communication process has been a hotspot issue which needs to be solved in the industry.

SUMMARY OF THE INVENTION

The present document provides a video encoding and decoding method, device and system to further enhance the video compression efficiency and improve quality of the user experience.

To achieve the objective of the present document, the present document employs the following technical scheme:

a video encoding and decoding method, comprising video encoding steps, wherein the video encoding steps comprise:

A, after using a standard encoding algorithm to complete encoding a luminance component in a current image, judging, based on refreshing images preset by an encoding device, whether there is a need to encode a chrominance component in the current image according to the standard encoding algorithm or not, and proceeding to step C if the current image is not any one of the refreshing images preset by the encoding device, and proceeding to step B if the current image is one of the refreshing images;

B, encoding a corresponding chrominance component according to the standard encoding algorithm based on a judgment result; and C, based on the judgment result, not encoding the corresponding chrominance component according to the standard encoding algorithm, wherein an encoding reconstruction of the chrominance component is obtained by copying a corresponding chrominance component in a reference image of luminance component, so that a finally output code stream does not comprise information of the chrominance component.

The step of judging whether there is a need to encode the chrominance component in the current image according to the standard encoding algorithm based on the refreshing images preset by the encoding device comprises:

if the current image is not any one of the refreshing images preset by the encoding device, setting a first judgment flag in header information of the current image to indicate that the corresponding chrominance component is not encoded according to the standard encoding algorithm; and if the current image is one of the refreshing images preset by the encoding device, setting a second judgment flag in the header information of the current image to indicate that the corresponding chrominance component is encoded according to the standard encoding algorithm.

The refreshing images comprise at least one of intra-frame encoding images set by the encoding device, scene switching images and the next image following every other N images set according to a practical application.

The step of encoding the corresponding chrominance component according to the standard encoding algorithm comprises: take a macro block as a unit to perform prediction, transformation, quantization and entropy encoding processing on the chrominance component according to the standard encoding algorithm, wherein the encoding reconstruction of the chrominance component is obtained by predicting a corresponding chrominance component in a reference image of chrominance component.

The method further comprises video decoding steps, and the video decoding steps comprise:

D, obtaining a video code stream, and analyzing information of a judgment flag in header information of a current image, and proceeding to step E if the judgment flag is the first judgment flag, and proceeding to step F if the judgment flag is the second judgment flag;

E, decoding and outputting a chrominance component which is not encoded according to the standard encoding algorithm, wherein a decoding reconstruction of the chrominance component is obtained by copying the corresponding chrominance component in the reference image of luminance component; and F, normally decoding and outputting a chrominance component which is encoded according to the standard encoding algorithm.

The step of normally decoding the chrominance component which is encoded according to the standard encoding algorithm comprises: taking a macro block as a unit to perform entropy decoding, inverse quantization, inverse transformation and prediction reconstruction processing on the chrominance component.

An encoding device comprises:

a first analysis module, which is configured to: after using a standard encoding algorithm to complete encoding a luminance component in a current image, judge, based on preset refreshing images, whether there is a need to encode the chrominance component in the current image according to the standard encoding algorithm or not, send a first control command to a first execution module if the current image is not any one of the preset refreshing images, and send a second control command to the first execution module if the current image is one of the preset refreshing images; and a first execution module, which is configured to:

encode a corresponding chrominance component according to the standard coding algorithm based on the second control command; and not encode the corresponding chrominance component according to the standard encoding algorithm based on the first control command, wherein an encoding reconstruction of the chrominance component is obtained by copying a corresponding chrominance component in a reference image of luminance component, so that a finally output code stream does not comprise information of the chrominance component.

The first analysis module is configured to judge whether there is a need to encode the chrominance component in the current image according to the standard encoding algorithm or not through a following way:

if the current image is not any one of the preset refreshing images, setting a first judgment flag in header information of the current image to indicate that the corresponding chrominance component is not encoded according to the standard encoding algorithm; and if the current image is one of the preset refreshing images, setting a second judgment flag in the header information of the current image to indicate that the corresponding chrominance component is encoded according to the standard encoding algorithm.

the refreshing images comprise at least one of set intra-frame encoding images, scene switching images, and the next image following every other N images set according to a practical application.

The first execution module is configured to encode the corresponding chrominance component according to the standard encoding algorithm based on the second control command in a following way: taking a macro block as a unit to perform prediction, transformation, quantization and entropy encoding on the chrominance component according to the standard encoding algorithm, wherein the encoding reconstruction of the chrominance component is obtained by predicting a corresponding chrominance component in a reference image of chrominance component.

A decoding device comprises:

a second analysis module, which is configured to: obtain a video code stream, analyze information of a judgment flag in header information of a current image, send a third control command to a second execution module if the judgment flag is a first judgment flag, and send a fourth control command to the second execution module if the judgment flag is a second judgment flag, wherein at an encoding device end, set the first judgment flag in the header information of the image to indicate that a corresponding chrominance component is not encoded according to a standard encoding algorithm if the image is not any one of refreshing images preset by an encoding device, wherein an encoding reconstruction of the chrominance component is obtained by copying a corresponding chrominance component in a reference image of luminance component; if the image is any one of the refreshing images preset by the encoding device, set the second judgment flag in the header information of the image to indicate that the corresponding chrominance component is encoded according to the standard encoding algorithm; and a second execution module, which is configured to: decode and output a chrominance component which is not encoded according to the standard encoding algorithm based on the third control command, wherein the decoding reconstruction of the chrominance component is obtained by copying the corresponding chrominance component in the reference image of luminance component; and, normally decode and output a chrominance component which is encoded according to the standard encoding algorithm based on the fourth control command.

The second execution module is configured to normally decode the chrominance component which is encoded according to the standard encoding algorithm through a following way: taking a macro block as a unit to perform entropy decoding, inverse quantization, inverse transformation, and prediction reconstruction processing on the chrominance component.

The refreshing images comprise at least one of the set intra-frame encoding images, the scene switching images, and the next image following every other N images set according to a practical application.

A video encoding and decoding system comprises:

an encoding device, which is configured to: after using a standard encoding algorithm to complete encoding a luminance component in a current image, judge whether there is a need to encode a chrominance component in the current image according to the standard encoding algorithm or not based on preset refreshing images, if the current image is not any one of the preset refreshing images, set a first judgment flag in header information of the image to indicate that a corresponding chrominance component is not encoded according to the standard encoding algorithm, wherein an encoding reconstruction of the chrominance component is obtained by copying a corresponding chrominance component in a reference image of luminance component, so that a finally output code stream does not comprise information of the chrominance component; if the current image is any one of the preset refreshing images, set a second judgment flag in the header information of the image to indicate that the corresponding chrominance component is encoded according to the standard encoding algorithm and output; and a decoding device, which is configured to: after obtaining a video code stream, analyze information of a judgment flag in the header information of the current image, and decode and output a chrominance component which is not encoded according to the standard encoding algorithm if the judgment flag is the first judgment flag, wherein a decoding reconstruction of the chrominance component is obtained by copying the corresponding chrominance component in the reference image of luminance component, and normally decode and output a chrominance component which is encoded according to the standard encoding algorithm if the judgment flag is the second judgment flag.

The refreshing images comprise at least one of the set intra-frame encoding images, the scene switching images, and the next image following every other N images set according to a practical application.

From the abovementioned technical scheme, it can be seen that, the video encoding and decoding method provided in the present document can effectively enhance the video compression efficiency under the video communication application, and the video subjective quality will not be largely decreased, and meanwhile, it can also significantly reduce the complexity of the codec and save the hardware resources, in addition, the method is easily compatible with existing video standards and is easy to use.

Hereinafter, the implementation, features and excellent effects of the objective of the present document will be further described in conjunction with specific embodiments and the accompanying drawings.

DETAILED DESCRIPTION

Hereinafter, in conjunction with the accompanying drawings and specific embodiments, the technical scheme of the present document will be described in further detail, so that those skilled in the art can better understand and implement the patent document, but the illustrated embodiment are not intended to limit the patent document.

The inventors of the patent document have observed that, the research on the color sensitivity of human visual system shows that in the general color space of digital video (such as the YUV color space), the human eyes are much more sensitive to a luminance component (Y component) than to a chrominance component (U and V components), especially in the video communication, a small change in the luminance component can easily cause the human eyes' attention, while a small change in the chrominance is unlikely to cause the human eyes' attention. Therefore, the inventors of the patent document can think therefrom that the characteristic of different sensitivities of the human eyes to respective components in the color space can be used to improve the chrominance encoding in the video communication, to further enhance the video compression efficiency and improve the quality of user experience.

A video encoding and decoding method provided in the embodiment of the present invention comprises video encoding steps and video decoding steps, wherein the video encoding steps comprise:

in S101, after using the standard encoding algorithm to complete encoding a luminance component in a current image, whether there is a need to encode a chrominance component in the current image according to the standard encoding algorithm or not is judged based on refreshing images preset by an encoding device, proceeding to step S103 if the current image is not any one of the refreshing images preset by the encoding device, otherwise proceeding to step S102;

in S102, the corresponding chrominance component is encoded according to the standard encoding algorithm;

in S103, the corresponding chrominance component is not encoded according to the standard encoding algorithm, wherein the encoding reconstruction of the chrominance component is obtained by copying the corresponding chrominance component in the reference image of luminance component, so that the finally output code stream does not comprise information of the corresponding chrominance component.

The standard encoding algorithm is a plurality of existing standard video encoding algorithms, such as the video encoding algorithm supporting the H.264 standard.

In a specific implementation, preferably, in the step S101, the method for judging whether there is a need to encode the chrominance component in the current image according to the standard encoding algorithm or not based on the refreshing images preset by the encoding device comprises:

(1) if the current image is not any one of the refreshing images preset by the encoding device, setting the first judgment flag in the header information of the current image to indicate that the corresponding chrominance component is not encoded according to the standard encoding algorithm;

(2) if the current image is one of the refreshing images preset by the encoding device, setting the second judgment flag in the header information of the current image to indicate that the corresponding chrominance component is encoded according to the standard encoding algorithm.

The refreshing images comprise but not limited to the intra-frame encoding images set by the encoding device, the scene switching images and the next image following every other N images set according to the practical application.

Preferably, in the step S102, the method for encoding the corresponding chrominance component according to the standard encoding algorithm comprises: take the macro block as the unit to perform prediction, transformation, quantization and entropy encoding processing on the corresponding chrominance component according to the standard encoding algorithm, wherein the encoding reconstruction of the chrominance component is obtained by predicting the corresponding chrominance component in the reference image of chrominance component.

In addition, the video decoding steps comprised in the video encoding and decoding method comprise:

in S104, a video code stream is obtained, and information of the judgment flag in the header information of the current image is analyzed, proceeding to step S105 if the judgment flag is the first judgment flag, proceeding to step S106 if the judgment flag is the second judgment flag;

in S105, the chrominance component which is not encoded according to the standard encoding algorithm is decoded and output, wherein the decoding reconstruction of the chrominance component is obtained by copying the corresponding chrominance component in the reference image of luminance component;

in S106, the chrominance component which is encoded in accordance with the standard encoding algorithm is normally decoded and output.

Preferably, in the step S106, the method for normally decoding the chrominance component which is encoded according to the standard encoding algorithm comprises: taking the macro block as the unit to perform entropy decoding, inverse quantization, inverse transformation and prediction reconstruction processing on the corresponding chrominance component.

Figure 1:
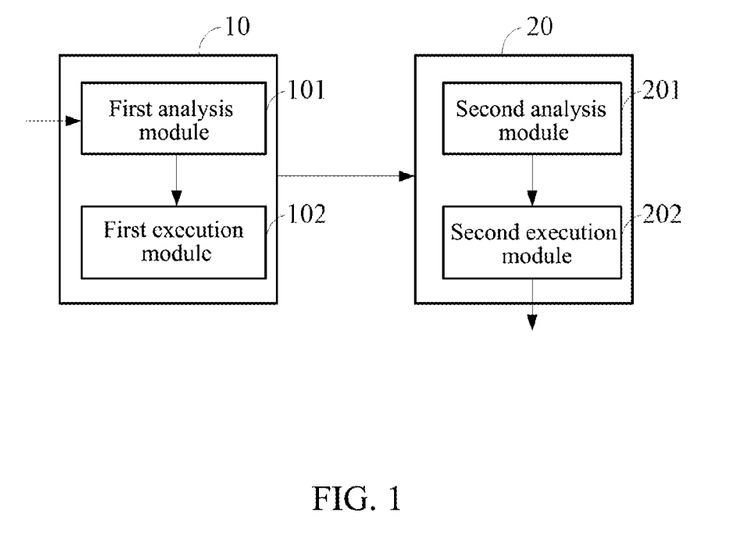
FIG. 1 is a structural diagram of a video encoding and decoding system provided in an embodiment of the present invention.

The embodiment of the present invention further provides an encoding device 10, as shown in FIG. 1, comprising:

a first analysis module 101, which is configured to: after using the standard encoding algorithm to complete encoding the luminance component in the current image, judge whether there is a need to encode the chrominance component in the current image according to the standard encoding algorithm or not based on the preset refreshing images, and if the current image is not any one of the preset refreshing images, send the execution module the first control command for not encoding the corresponding chrominance component according to the standard encoding algorithm, otherwise send the execution module the second control command for encoding the corresponding chrominance component according to the standard encoding algorithm; and a first execution module 102, which is configured to: encode the corresponding chrominance component according to the standard encoding algorithm based on the second control command; and not encode the corresponding chrominance component according to the standard encoding algorithm based on the first control command, wherein the encoding reconstruction of the chrominance component is obtained by copying the corresponding chrominance component in the reference image of luminance component, so that the finally output code stream does not comprise information of the corresponding chrominance component.

The first analysis module 101 is configured to judge whether there is a need to encode the chrominance component in the current image according to the standard encoding algorithm or not in the following way:

(1) if the current image is not any one of the preset refreshing images, setting the first judgment flag in the header information of the current image to indicate that the corresponding chrominance component is not encoded according to the standard encoding algorithm;

(2) if the current image is any one of the preset refreshing images, setting the second judgment flag in the header information of the current image to indicate that the corresponding chrominance component is encoded according to the standard encoding algorithm.

The refreshing images comprise at least one of the set intra-frame encoding images, the scene switching images, and the next image following every other N images set according to the practical application.

The first execution module 102 is configured to encode the corresponding chrominance component according to the standard encoding algorithm in the following way: taking the macro block as the unit to perform prediction, transformation, quantization and entropy encoding on the corresponding chrominance component in accordance with the standard encoding algorithm, wherein the encoding reconstruction of the chrominance component is obtained by predicting the corresponding chrominance component in the reference image of chrominance component.

Continuing to refer to FIG. 1, the embodiment of the present invention further provides a decoding device 20, comprising:

a second analysis module 201, which is configured to: obtain a video code stream, and analyze information of the judgment flag in the header information of the current image, send the second execution module 202 a third control command for decoding the chrominance component which is not encoded according to the standard encoding algorithm if the judgment flag is the first judgment flag, and send the second execution module 202 a fourth control command for normally decoding the chrominance component which is encoded according to the standard encoding algorithm if the judgment flag is the second judgment flag, wherein at the encoding device 10 end, if the image is not any one of the refreshing images preset by the encoding device 10, set the first judgment flag in the header information of the image to indicate that the corresponding chrominance component is not encoded according to the standard encoding algorithm, wherein the encoding reconstruction of the chrominance component is obtained by copying the corresponding chrominance component in the reference image of luminance component, so that the finally output code stream does not comprise information of the corresponding chrominance component; if the image is any one of the refreshing images preset by the encoding device 10, set the second judgment flag in the header information of the image to indicate that the corresponding chrominance component is encoded according to the standard encoding algorithm; and the second execution module 202, which is configured to: decode and output the chrominance component which is not encoded according to the standard encoding algorithm based on the third control command, wherein the decoding reconstruction of the chrominance component is obtained by copying the corresponding chrominance component in the reference image of luminance component; and, normally decode and output the chrominance component which is encoded according to the standard encoding algorithm based on the fourth control command.

The second execution module 202 is configured to normally decode the chrominance component encoded according to the standard encoding algorithm in the following way: taking the macro block as the unit to perform entropy decoding, inverse quantization, inverse transformation, and prediction reconstruction processing on the corresponding chrominance component.

The refreshing images comprise at least one of the set intra-frame encoding images, the scene switching images and the next image following every other N images set according to the practical application.

As shown in FIG. 1, the embodiment of the present invention further provides a video encoding and decoding system, comprising:

an encoding device 10, which is configured to: after using the standard encoding algorithm to complete encoding the luminance component in the current image, judge whether there is a need to encode the chrominance component in the current image according to the standard encoding algorithm or not based on the refreshing images preset by the encoding device 10, and if the current image is not any one of the preset refreshing images preset by the encoding device 10, set the first judgment flag in the header information of the image to indicate that the corresponding chrominance component is not encoded according to the standard encoding algorithm, wherein the encoding reconstruction of the chrominance component is obtained by copying the corresponding chrominance component in the reference image of luminance component, so that the finally output code stream does not comprise information of the corresponding chrominance component; otherwise, set the second judgment flag in the header information of the image to indicate that the corresponding chrominance component is encoded according to the standard encoding algorithm and output; and a decoding device 20, which is configured to: after obtaining the video code stream, analyze information of the judgment flag in the header information of the current image, decode and output the chrominance component which is not encoded according to the standard encoding algorithm if it is the first judgment flag, wherein the decoding reconstruction of the chrominance component is obtained by copying the corresponding chrominance component in the reference image of luminance component, and normally decode and output the chrominance component encoded according to the standard encoding algorithm if it is the second judgment flag.

The refreshing images comprise at least one of the set intra-frame encoding images, the scene switching images, and the next image following every other N images set according to the practical application.

Hereinafter, the H.264 video compression standard is taken as an example to describe the patent document in further detail.

The specific implementation steps of the encoding device 10 end are as follows:

in step 1: as shown in FIG. 1, after using the H.264 video compression standard technology to encode the luminance component in the current image, whether the chrominance component in the current image needs to be encoded according to the H.264 standard technology is judged. If the current image is not any one of the refreshing images set by the encoder, a judgment flag (e.g., which can be set to two bits) is firstly set in the slice header information to indicate that the chrominance component u in the current slice is not encoded according to the H.264 standard, and specifically as shown in Table 1, for example, the judgment flag can be set to 01, 10 or 11, proceeding to the second step; otherwise, the judgment flag is set to 00, proceeding to the third step.

The refreshing images set by the encoding device 10 may comprise but not limited to: I images, IDR images, scene switching images, and the refreshing image set by the encoding device 10 which is the refreshing image following every other N images according to the practical application.

TABLE 1

Description of chrominance component encoding judgment flag

| Judgment flag | Definition Description |
|---|---|
| 00 | Two components U and V are encoded according to the H.264 video compression standard |
| 01 | Only the component U is encoded according to the H.264 video compression standard, and the component V is not encoded |
| 10 | Only the component V is encoded according to the H.264 video compression standard, and the component U is not encoded |
| 11 | The two components U and V are not encoded | in step 2: the encoding reconstruction of the non-encoded chrominance component is obtained directly by copying the corresponding chrominance component in the reference image of luminance component, continuing to refer to Table 1, for example:

1) when the judgment flag is 11, the chrominance components U and V are not encoded, the encoding reconstructions of the two components are directly obtained by copying the corresponding chrominance components U and V in the reference image of luminance component, and the finally output code stream does not comprise information of the chrominance components U and V;

2) when the judgment flag is 01, the chrominance component V is not encoded, and its encoding reconstruction is directly obtained by copying the corresponding chrominance component V in the reference image of luminance component, and the finally output code stream does not comprise information of the chrominance component V, and the processing on the chrominance component U proceeds to the third step;

3) when the judgment flag is 10, the chrominance component U is not encoded, and its encoding reconstruction is directly obtained by copying the corresponding chrominance component U in the reference image of luminance component, and the finally output code stream does not comprise information of the chrominance component U, and the processing on the V chrominance component proceeds to the third step.

in the third step: for the chrominance component encoded with the H.264 standard technology, the macro block is taken as the unit to perform prediction, transformation, quantization and entropy encoding on the corresponding chrominance component, and its encoding reconstruction is obtained by predicting the corresponding chrominance component in the reference image of chrominance component, continuing to refer to Table 1, for example:

1) when the judgment flag is 00, the chrominance components U and V are encoded with the H.264 standard technology, and the encoding reconstructions are obtained by predicting the corresponding chrominance components U and V in the reference image of chrominance component, and the finally output code stream comprises information of the chrominance components U and V;

2) when the judgment flag is 01, only the chrominance component U is encoded with the H.264 standard technology, and its encoding reconstruction is obtained by predicting the corresponding chrominance component U in the reference image of luminance component U, and the finally output code stream only comprises information of the chrominance component U;

3) when the judgment flag is 10, only the chrominance component V is encoded with the H.264 standard technology, and the encoding reconstruction is obtained by predicting the corresponding chrominance component U in the reference image of luminance component V, and the finally output code stream only comprises information of the chrominance component V.

Figure 2:
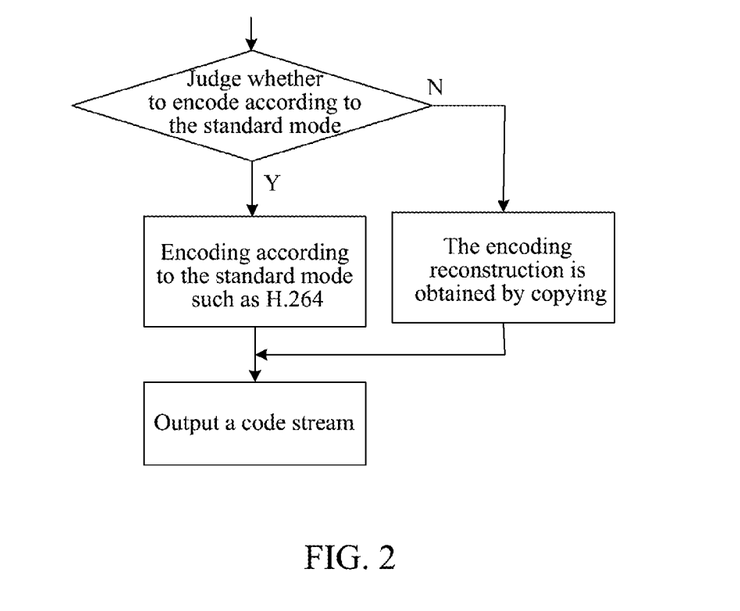
FIG. 2 is a schematic diagram of a video encoding process provided in an embodiment of the present invention.
Figure 3:
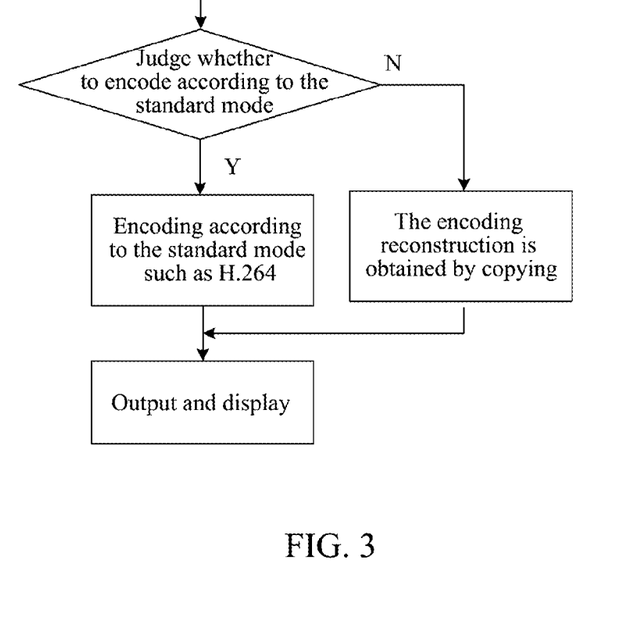
FIG. 3 is a schematic diagram of a video decoding process provided in an embodiment of the present invention.

The specific implementation steps of the decoding device 20 end are as follows:

in the first step: as shown in FIG. 2, the chrominance encoding judgment flag in the slice header information in the H.264 code stream is analyzed. If the judgment flag is 11, it is to indicate that the chrominance components U and V do not need to be decoded according to the H.264 standard, proceeding to the second step; if the judgment flag is 10, it is to indicate that the chrominance component V needs to be decoded according to the H.264 standard, proceeding to the third step, and the chrominance component U does not need to be decoded according to the H.264 standard, proceeding to the second step; if the judgment flag is 01, it is to indicate that the chrominance component U needs to be decoded according to the H.264 standard, proceeding to the third step, and the chrominance component V does not need to be decoded according to the H.264 standard, proceeding to the second step; if the judgment flag is 00, it is to indicate that the chrominance components U and V need to be decoded according to the H.264 standard, proceeding to the third step;

in the second step: for the chrominance component which does not need to be decoded according to the H.264 standard, its decoding reconstruction is directly obtained by copying the corresponding chrominance component in the reference image of luminance component and output and displayed, for example:

1) when the judgment flag is 11, the decoding reconstructions of the chrominance components U and V are directly obtained by copying the corresponding chrominance components U and V in the reference image of luminance component, and output and displayed;

2) when the judgment flag is 01, the decoding reconstruction of the chrominance component V is directly obtained by copying the corresponding chrominance component V in the reference image of luminance component, and output and displayed, and the processing on the chrominance component U proceeds to the third step;

3) when the judgment flag is 10, the decoding reconstruction of the chrominance component U is directly obtained by copying the corresponding chrominance component U in the reference image of luminance component, and output and displayed, and the processing on the chrominance component V proceeds to the third step.

In the third step: for the chrominance component which needs to be decoded with the H.264 standard technology, the macro block is taken as the unit to perform entropy decoding, reverse quantization, reverse transformation and prediction reconstruction on the corresponding chrominance component, and output and display it, for example:

1) when the judgment flag is 00, the chrominance components U and V are decoded with the H.264 standard technology;

2) when the judgment flag is 01, only the chrominance component U is decoded with the H.264 standard technology;

3) when the judgment flag is 10, only the chrominance component V is decoded with the H.264 standard technology.

The above description is only preferred embodiments of the present invention and not intended to limit the patent scope of the patent document, and all the equivalent structures or equivalent process transformations made by using the specification and the accompanying drawings of the patent document, or direct or indirect used in other related technical fields, should be all included within the patent protection scope of the patent document.

INDUSTRIAL APPLICABILITY

Compared with the related art, the video encoding and decoding method provided in the present document can effectively enhance the video compression efficiency under the video communication application, and the video subjective quality will not be largely decreased, and meanwhile, it can also significantly reduce the complexity of the codec and save the hardware resources, in addition, the method is easily compatible with existing video standards and is easy to use.

What is claimed is:

1. A video encoding and decoding method, comprising video encoding steps, wherein the video encoding steps comprise:
   A, after using a standard encoding algorithm to complete encoding a luminance component in a current image, judging, based on refreshing images preset by an encoding device, whether there is a need to encode a chrominance component in the current image according to the standard encoding algorithm or not, and proceeding to step C if when the current image is not any one of the refreshing images preset by the encoding device, and proceeding to step B if when the current image is any one of the refreshing images;
   wherein the refreshing images comprise at least one of intra-frame encoding images set by the encoding device, scene switching images, and a next image following every other N images set according to a practical application;
   B, encoding a corresponding chrominance component according to the standard encoding algorithm based on a judgment result; and
   C, based on the judgment result, not encoding the corresponding chrominance component according to the standard encoding algorithm, wherein an encoding reconstruction of the chrominance component is obtained by copying a corresponding chrominance component in a reference image of luminance component, so that a finally output code stream does not comprise information of the chrominance component.

2. The video encoding and decoding method of claim 1, wherein the step of judging whether there is a need to encode the chrominance component in the current image according to the standard encoding algorithm based on the refreshing images preset by the encoding device comprises:
   when the current image is not any one of the refreshing images preset by the encoding device, setting a first judgment flag in header information of the current image to indicate that the corresponding chrominance component is not encoded according to the standard encoding algorithm; and
   when the current image is any one of the refreshing images preset by the encoding device, setting a second judgment flag in the header information of the current image to indicate that the corresponding chrominance component is encoded according to the standard encoding algorithm.

3. The video encoding and decoding method of claim 1, wherein the step of encoding the corresponding chrominance component according to the standard encoding algorithm comprises: take a macro block as a unit to perform prediction, transformation, quantization and entropy encoding processing on the chrominance component according to the standard encoding algorithm, wherein the encoding reconstruction of the chrominance component is obtained by predicting a corresponding chrominance component in a reference image of chrominance component.

4. The video encoding and decoding method of claim 2, further comprising video decoding steps, wherein the video decoding steps comprise:
   D, obtaining a video code stream, and analyzing information of a judgment flag in header information of a current image, and proceeding to step E when the judgment flag is the first judgment flag, and proceeding to step F when f the judgment flag is the second judgment flag;
   E, decoding and outputting a chrominance component which is not encoded according to the standard encoding algorithm, wherein a decoding reconstruction of the chrominance component is obtained by copying the corresponding chrominance component in the reference image of luminance component; and
   F, normally decoding and outputting a chrominance component encoded according to the standard encoding algorithm.

5. The video encoding and decoding method of claim 4, wherein the step of normally decoding the chrominance component encoded according to the standard encoding algorithm comprises: taking a macro block as a unit to perform entropy decoding, inverse quantization, inverse transformation and prediction reconstruction processing on the chrominance component.

6. An encoding device, comprising:
   a first analysis module, which is configured to: after using a standard encoding algorithm to complete encoding a luminance component in a current image, judge, based on preset refreshing images, whether there is a need to encode a chrominance component in the current image according to the standard encoding algorithm or not, send a first control command to a first execution module when the current image is not any one of the preset refreshing images, and send a second control command to the first execution module when the current image is any one of the preset refreshing images; wherein the refreshing images comprise at least one of set intra-frame encoding images, scene switching images, and a next image following every other N images set according to a practical application;

the first execution module, which is configured to:

encode a corresponding chrominance component according to the standard encoding algorithm based on the second control command; and not encode the corresponding chrominance component according to the standard encoding algorithm based on the first control command, wherein an encoding reconstruction of the chrominance component is obtained by copying a corresponding chrominance component in a reference image of luminance component, so that a finally output code stream does not comprise information of the chrominance component.

7. The encoding device of claim 6, wherein the first analysis module is configured to judge whether there is a need to encode the chrominance component in the current image according to the standard encoding algorithm or not in a following way:

when the current image is not any one of the preset refreshing images, setting a first judgment flag in header information of the current image to indicate that the corresponding chrominance component is not encoded according to the standard encoding algorithm; and when the current image is any one of the preset refreshing images, setting a second judgment flag in the header information of the current image to indicate that the corresponding chrominance component is encoded according to the standard encoding algorithm.

8. The encoding device of claim 6, wherein the first execution module is configured to encode the corresponding chrominance component according to the standard encoding algorithm based on the second control command in a following way: taking a macro block as a unit to perform prediction, transformation, quantization and entropy encoding on the chrominance component according to the standard encoding algorithm, wherein the encoding reconstruction of the chrominance component is obtained by predicting a corresponding chrominance component in a reference image of chrominance component.

9. A decoding device, comprising:

a second analysis module, which is configured to: obtain a video code stream, analyze information of a judgment flag in header information of a current image, send a third control command to a second execution module when the judgment flag is a first judgment flag, and send a fourth control command to the second execution module when the judgment flag is a second judgment flag, wherein at an encoding device end, set the first judgment flag in the header information of the image to indicate that a corresponding chrominance component is not encoded according to a standard encoding algorithm when the image is not any one of refreshing images preset by an encoding device, wherein an encoding reconstruction of the chrominance component is obtained by copying a corresponding chrominance component in a reference image of luminance component; when the image is any one of the refreshing images preset by the encoding device, set the second judgment flag in the header information of the image to indicate that a corresponding chrominance component is encoded according to the standard encoding algorithm; wherein the refreshing images comprise at least one of set intra-frame encoding images, scene switching images, and a next image following every other N images set according to a practical application;

the second execution module, which is configured to: decode and output a chrominance component which is not encoded according to the standard encoding algorithm based on the third control command, wherein a decoding reconstruction of the chrominance component is obtained by copying the corresponding chrominance component in the reference image of luminance component; and, normally decode and output a chrominance component encoded according to the standard encoding algorithm based on the fourth control command.

10. The decoding device of claim 9, wherein the second execution module is configured to normally decode the chrominance component encoded according to the standard encoding algorithm in a following way: taking a macro block as a unit to perform entropy decoding, inverse quantization, inverse transformation, and prediction reconstruction processing on the chrominance component.

* * * * *